Jan. 2, 1940. K. YAMADA 2,185,936
SAFETY AUTOMATIC STOPPING DEVICE FOR AUTOMOBILES AND THE LIKE VEHICLES
Filed Dec. 1, 1938 2 Sheets-Sheet 2
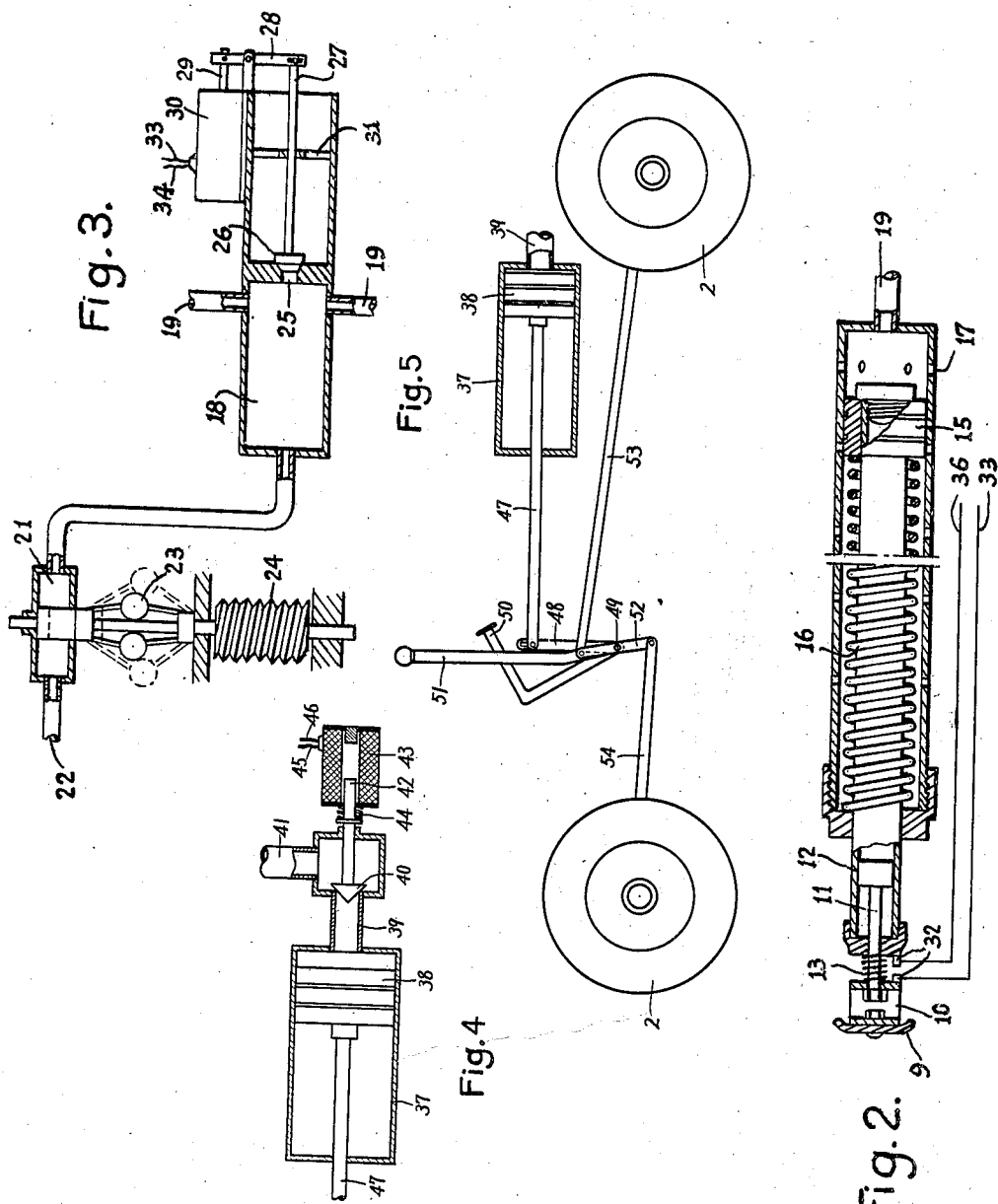
INVENTOR.
K. Yamada
By: Glascock Downing & Seebold
Attys.

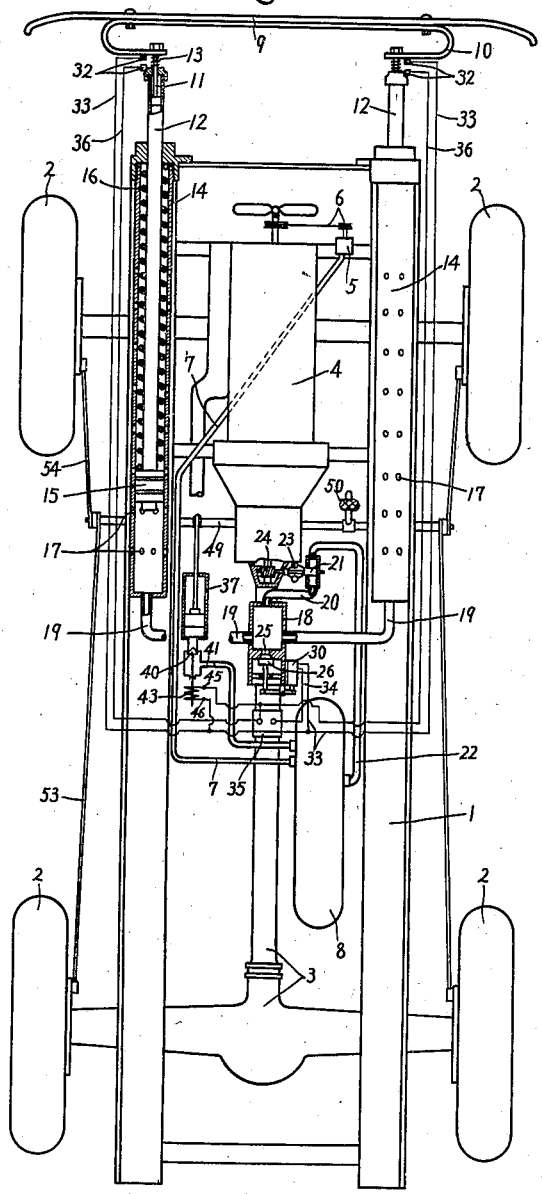

Patented Jan. 2, 1940

2,185,936

UNITED STATES PATENT OFFICE 2,185,936

SAFETY AUTOMATIC STOPPING DEVICE FOR AUTOMOBILES AND THE LIKE VEHICLES

Kiiti Yamada, Nagoya, Japan

Application December 1, 1938, Serial No. 243,454
In Japan October 14, 1938

2 Claims. (Cl. 180—83)

My invention relates to improvements in a safety automatic stopping device for automobiles and the like vehicles and more particularly to means for automatically applying emergency brakes, operated by a pneumatic cylinder controlled by an electrically operated valve, to wheels under the control of a bumper and speed responsive governor device, and its object is to provide a safety stopping device for automobiles and like vehicles in case of emergency such as collision.

In accordance with my invention an air compressor is driven by the prime mover for the vehicle itself while running to store the compressed air in a reservoir and a bumper is held in positions in front of the vehicle varying in dependence on the vehicle speed and means is provided to apply the wheel brakes upon engagement of the bumper with an obstacle and to release the bumper for rearward displacement.

My invention will be better understood from the following description when considered in connection with the accompanying drawings, and its scope will be pointed out in the appended claims.

In the drawings, Fig. 1 is a diagrammatic plan view of an automobile showing the application of my invention; Fig. 2 is a sectional view of the bumper operating cylinder; Fig. 3 is a partial sectional plan view of the distributing cylinder and governor valve, Fig. 4 is a sectional view of the brake cylinder and its controlling solenoid valve; and Fig. 5 is a side view showing the arrangement of brake operating levers, Figs. 2 to 5 being drawn in an enlarged scale.

Referring to the accompanying drawings, 1 represents the frame of an automobile; 2 designates wheels; 3 is the housing for the main driving shaft driven by the engine 4. In accordance with my invention an air compressor 5 is arranged to be driven by the engine 4 through a suitable transmission device 6. The delivery pipe 7 of the compressor 5 is connected to a pressure tank or reservoir 8 serving as the operating energy source. 9 represents a bumper secured at each end to a spring member 10 which has a projecting shank 11 inserted into the hollow end of the plunger rod 12 with the spring 13 interposed between the spring 10 and the rod 12. The plunger rod 12 is extended into the cylinder 14 which is fixed to the frame 1 and has a piston 15 secured to the end of the rod. The piston 15 is actuated by a spiral spring 16 and the cylinder 14 has a number of small exhaust holes 17 located at different points in its length and the cylinder 14 is connected with a distributing cylinder 18 through the pipe 19.

The distributing cylinder 18 is, as more clearly shown in Fig. 3, connected through a pipe 20, a governor valve 21 and a pipe 22 to the compressed air reservoir 8. The governor valve 21 is connected with the centrifugal device 23 which is connected with the gear 24 engaging a part of the transmission gearing of the engine to be driven thereby at a speed proportional to that of the automobile. If the centrifugal device 23 is driven at a higher speed the valve 21 opens the passage wider to pass a greater quantity of compressed air therethrough and deliver it to the cylinders 14 through the pipe 19. The cylinder 18 has an exhaust port 25 which is opened or closed by a valve 26, the valve rod 27 of which is hinged to an operating lever 28. The lever 28 is connected to the armature 29 of an electromagnet 30 which when energized acts to open the valve 26. 31 represents exhaust openings.

The electro-magnet 30 is under the control of a switch 32 put on the top of the plunger rod 12. The switch 32 is constructed to be closed when the bumper 9 is shifted to the backward position in case of collision. One member of the switch 32 is connected through the conductor 33 to one terminal of the electro-magnet 30, and the other terminal 34 of the electro-magnet is connected to one side of a battery 35 and the other side of the battery 35 is connected to the switch 32 through the conductor 36. Thus when the switch 32 is closed the valve 26 opens the exhaust port 25 to relieve the pressure in the distributing cylinder directly and not to deliver the pressure to the cylinders 14.

The brake system consists of a pneumatic cylinder 37 (refer to Fig. 4) having a piston 38 slidably fitted therein to operate the brake on the wheel through a suitable link and lever mechanism. The cylinder 37 is connected to the pressure reservoir 8 through the pipe 39, a solenoid valve 40 and the pipe 41. The solenoid valve 40 is connected with the armature 42 of an electro-magnet 43 and the valve 40 opens the pipe passage 41 when the electro-magnet 43 is energized against the bias of the spring 44. The coil 43 of the electro-magnet is connected to the circuit of the switch 32 and the battery 35 through the terminal conductors 45 and 46.

The piston rod 47 of the brake cylinder piston 38 (refer to Fig. 5) is connected with the lever 48 which is fixed to the brake operating shaft 49. To the shaft 49 are fixed the foot pedal lever 50, handle 51 and arm 52 which is connected to the rods 53 and 54 for operating band brakes on the vehicle wheels.

The operation of the above described device is as follows: When the automobile is running the air compressor 5 is driven by the engine and charges the compressed air automatically into the reservoir 8 through the pipe 7 and the governor valve 21 opens the port in proportion to the vehicle speed so that pressure proportional to the speed of the automobile is applied to the pistons 15 in the cylinders 14 through the distributing chamber 18 and the pipes 19. Then the pistons 15 are pushed forward and occupy the position where the force of the spring 16 and the air pressure overcoming the leakage through the holes 17 balance. Thus the bumper 9 is held at a suitable forward position corresponding to the speed of the automobile to be responsive to an accidental collision. Prior to actual collision of the vehicle, the bumper 9 is first moved backward against the spring 13 to close the switch 32. Then the electrical circuits for the electromagnets 30 and 43 are established through the switch 32 to open the valves 26 and 40 respectively. At this moment the compressed air supply to the cylinders 14 is relieved through the opening 25 while the compressed air is supplied to the brake cylinder 37 so that the piston 38 is pushed forward by the air pressure and applies the brakes at once to stop the automobile safely before the violent collision takes place.

I claim:

1. A safety automatic stopping device for motor vehicles comprising wheels and brakes for said wheels, a compressed air reservoir, a bumper movably held at the front of the vehicle, a vehicle operated governor valve connected with said reservoir, means controlled by said valve for holding said bumper in positions varying in dependence on the speed of the vehicle, an electric valve device for rendering the bumper holding means ineffective, a pneumatic brake device for applying the brakes to the vehicle wheels, and a switch operated by said bumper upon impact with an obstacle for actuating said valve and brake device.

2. A safety automatic stopping device for motor vehicles, comprising wheels and brakes for said wheels, a compressed air reservoir, cylinders supported by the vehicle and having exhaust apertures spaced longitudinally thereof, pistons movable in said cylinders adapted to successively uncover said apertures, springs normally tending to move said pistons rearwardly of the vehicle, rods carried by the pistons, a bumper secured to said rods and movable relative thereto, a distributing chamber connected with said cylinders and with said reservoir, a vehicle operated governor valve for controlling the passage of air from the reservoir to said distributing chamber and cylinders, whereby the air supplied to the cylinders varies in dependence upon the vehicle speed and acts upon said pistons to move the latter together with the bumper to variable positions, a further air exhaust valve in said distributing chamber, means for applying the brakes to the vehicle wheels, and means controlled in dependence upon relative movement between the bumper and said rods for opening the air exhaust valve and actuating said brake applying means.

KIITI YAMADA.